US012338778B2

(12) United States Patent
Perrot et al.

(10) Patent No.: US 12,338,778 B2
(45) Date of Patent: Jun. 24, 2025

(54) METHOD OF OPERATING A FUEL INJECTION SYSTEM

(71) Applicant: PHINIA DELPHI LUXEMBOURG SARL, Belvaux (LU)

(72) Inventors: Baptiste Perrot, Blois (FR); David Gacon, Blois (FR)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/700,881

(22) PCT Filed: Oct. 11, 2022

(86) PCT No.: PCT/EP2022/078311
§ 371 (c)(1),
(2) Date: Apr. 12, 2024

(87) PCT Pub. No.: WO2023/062041
PCT Pub. Date: Apr. 20, 2023

(65) Prior Publication Data
US 2024/0410325 A1 Dec. 12, 2024

(30) Foreign Application Priority Data
Oct. 12, 2021 (GB) ...................................... 2114591

(51) Int. Cl.
*F02D 41/24* (2006.01)
*F02D 41/38* (2006.01)

(52) U.S. Cl.
CPC .... *F02D 41/2467* (2013.01); *F02D 2041/389* (2013.01); *F02D 2200/0602* (2013.01)

(58) Field of Classification Search
CPC .. F02D 41/0025; F02D 41/0027; F02D 41/20; F02D 41/2432; F02D 41/2451;
(Continued)

(56) References Cited

U.S. PATENT DOCUMENTS 6,050,240 A * 4/2000 Saiki ..................... F02D 41/061 123/179.17
10,393,052 B2 8/2019 Makino et al.
(Continued)

FOREIGN PATENT DOCUMENTS

EP 0196657 A2 10/1986
EP 2420664 A1 2/2012

OTHER PUBLICATIONS

International Search Report for PCT/EP2022/078311 dated Feb. 21, 2023, 4 pages.

*Primary Examiner* — Logan M Kraft
*Assistant Examiner* — Johnny H Hoang
(74) *Attorney, Agent, or Firm* — Warner Norcross + Judd LLP

(57) ABSTRACT

A method of controlling fuel injection in an internal combustion engine having at least one cylinder with an associated fuel injector for performing injector events, wherein for each injector event a drive signal is generated to cause an opening of the fuel injector to spray fuel in accordance with a demand fuel quantity. In a drive mode, the drive signal has a length, PWf, that corresponds to a reference length, PWref, determined from a reference map, MAP-PWref, of demand fuel quantity vs. pulse length, and corrected by a correction value, PWcorr. PWcorr is determined based on a map, MAP-PWcorr, depending on demand fuel quantity, the map MAP-PWcorr being learned during engine runtime and representing a difference between a learned, injector-specific hydraulic open time and a reference hydraulic open time.

7 Claims, 3 Drawing Sheets

(58) Field of Classification Search
CPC .. F02D 41/2467; F02D 41/247; F02D 41/248; F02D 41/3845; F02D 2041/2043; F02D 2041/205; F02D 2041/2055; F02D 2041/389; F02D 2200/0602; F02D 2200/0618; F02D 19/024; F02D 35/023; F02M 45/12; F02M 57/025; F02M 65/00; F02M 21/0245; Y02T 10/30
USPC .................................................. 701/103–105
See application file for complete search history.

(56) References Cited

U.S. PATENT DOCUMENTS

| | | | | |
|---|---|---|---|---|
| 2009/0084348 | A1 * | 4/2009 | Batenburg | F02D 35/024<br>123/294 |
| 2011/0137541 | A1 | 6/2011 | Malikopoulos | |
| 2016/0017832 | A1 * | 1/2016 | Touchette | F02D 41/248<br>701/104 |
| 2016/0237935 | A1 * | 8/2016 | Tanaka | F02D 41/247 |

* cited by examiner

MAP-PWcorr

| Qd | Pwcorr (Prail1) |
|---|---|
| $Q_1$ | $TRIM_1$ |
| $Q_2$ | $TRIM_2$ |
| ... | ... |
| ... | ... |
| $Q_N$ | $TRIM_N$ |

METHOD OF OPERATING A FUEL INJECTION SYSTEM

CROSS-REFERENCE TO RELATED APPLICATIONS

This application is the U.S. National Stage of International Application No. PCT/EP2022/078311 filed on 11 Oct. 2022, which claims priority to and all advantages of United Kingdom Application No. 2114591.7 filed on 12 Sep. 2021, the contents of which are incorporated herein by reference.

FIELD OF THE INVENTION

The present invention generally relates to fuel injection systems in internal combustion engines and more specifically to a method of operating a fuel injection system.

BACKGROUND OF THE INVENTION

The contemporary design of internal combustion engines must cope with the increasingly stringent regulations on pollutant emissions. Accordingly, automotive engineers strive for designing engines with low fuel consumption and low emissions of pollutants, which implies including electronic devices capable of monitoring the combustion performance and emissions in the exhaust gases.

A proper operation of a fuel-injected engine requires that the fuel injectors and their controller allow for a timely, precise and reliable fuel injection. Indeed, it is well known that problems arise when the performance, or more particularly the timing, and the quantity of fuel delivered by the injectors diverge beyond acceptable limits. For example, injector performance deviation or variability will cause different torques to be generated between cylinders due to unequal fuel quantities being injected, or from the relative timing of such fuel injection.

As it is known, fuel injectors are typically controlled by generating drive pulses which are sent to the actuators of the fuel injectors. The amount of fuel injected depends on the length (duration) of the pulse sent to the actuator. Typically, an Engine Control Unit adjusts the pulse length as a result of the demand quantity of fuel to be injected. The demand quantity of fuel is typically stored in a map which relates this to engine speed and torque demand.

Characteristics of fuel injectors may vary, as well as change over time for the same fuel injector, e.g. as a result of wear. It is important to calibrate the injection systems/injectors periodically so that variations in their lifetime are catered for, and that the control is adapted to deal with such variations. Techniques are known which apply learning strategies, whereby injector characteristics are freshly determined, and the injectors are consequently appropriately controlled.

In this context, a conventional operating method determines the length of the injector pulse PW width from a reference map in function of the fuel demand Q. In order to take into account individual injector behaviors, it is known to compensate the injector PW over time by learning. For this purpose, the injector behavior in the engine is analyzed, correction values are computed and applied during injector life. A known approach to calculate a corrective value, or trim, is based on a difference between an injector specific closing response (CR-time between end of pulse width and return of injector needle into closed position) and a reference CR representative of an injector family at a given PW.

Other approaches are based on Neural Networks that identify injector behaviors and determine correctives values for the injector control.

OBJECT OF THE INVENTION

The object of the present invention is to provide an improved method of controlling an injection system, with simple and efficient injector specific pulse width compensation.

This object is achieved by a method as claimed in claim 1.

SUMMARY OF THE INVENTION

The present invention relates to a method of controlling fuel injection in an internal combustion engine having at least one cylinder with an associated fuel injector for performing injector events. To perform an injector event, a drive signal is generated to cause an opening of the fuel injector to spray fuel in accordance with a demand fuel quantity.

In a drive mode, the drive signal has a length (i.e. time duration), PWf, that corresponds to a reference length, PWref, read from a reference map relating the demand fuel quantity to the corresponding pulse length PWref, and corrected by a correction value PWcorr (or 'trim' value).

The trim value PWcorr is read from a map, MAP-PWcorr, depending on demand fuel quantity. This map MAP-PWcorr is learned during engine runtime by comparing learned, injector-specific hydraulic open times and reference values of hydraulic open times. MAP-PWcorr thus contains corrective values expressed in energizing time (PW) in relation to given values of fuel demand.

The present invention proposes an efficient and simple to implement approach to determine the pulse width corrective value PWcorr that exploits the learned hydraulic open time of the injector(s) mounted in the engine.

'Hydraulic open time', noted HO, herein typically designates the time period between the moment the injector pintle/needle leaves its fully closed position to open and the moment it returns to its fully closed position, to close approximation. The time period between these two moments is the period during which the injector is open for injection, and thus also represents the injection rate.

As will be known in the art, HO may generally be expressed by the following formula:

$$HO = PW + a \cdot CR - b \cdot OD \qquad \text{[Eq. 1]}$$

where:

- PW is the pulse width, i.e. the logic command applied to the fuel injector to command the opening;
- CR is the Closing Response, i.e. the time elapsed from the end of the pulse width signal to the actual closing of the injector valve;
- OD is the Opening Delay, i.e. the time elapsed between the beginning of the pulse width signal and the moment the injector pintle starts moving;
- and a and b are coefficients allowing compensation for various effects, as may be required.

In this connection, one may notice that for some injector designs the opening delay may be substantially constant (e.g. for all injectors of such design), so that, in close approximation, the open time may simply be calculated as: PW+a.CR, where frequently a=1.

Both CR and OD can be determined on board the engine. The present method is not limited to a specific approach and any appropriate method to determine CR and OD of a fuel injector may be used.

As indicated, PWcorr is determined from an open loop map MAP-PWcorr where injector-specific correction values are related directly to the demand fuel quantity.

The present invention is designed to be advantageously implemented in a drive mode involving injector compensation, in particular where the length of the pulse width effectively applied to the injector is computed as:

$$PWf = PWref + PWcorr \quad \text{[Eq. 2]}$$

This equation reflects the principle that the actual pulse width value is determined from the conventional map MAP-PWref(Qd, PWref) and corrected by a trim value. However according to the present invention, the trim value is determined from the injector-specific MAP-PWcorr(Qd, PWcorr) that directly links demand fuel to the trim value, and has been learned in the engine.

Learning of map MAP-PWcorr may be done as follows. Injector events corresponding to a plurality of different fuel quantities over a predetermined range is performed. For this learning phase, the pulse width applied to the injector corresponds to the value determined from map MAP-PWref; i.e. injector is not compensated, contrary to drive mode. The CR and OD are determined for each injector event and the injector specific hydraulic open time, noted HO.m, is computed for the given fuel injection value. The learned values HO.m are stored vs. pulse width in a table MAP-HO.m.

In the learning phase, the injections may generally be repeated for a plurality of of fuel rail pressures and for each fuel injector.

The map MAP-PWcorr is then built from MAP-HO.m and based on a reference map MAP-HOref that relates reference HO values to demand fuel quantity. It may be noted here that MAP-PWref and MAP-HOref are reference tables, in the sense that they are statistically representative for an injector family (an injector model/build type or a manufacturing lot).

For each fuel value Qi of the map MAP-PWcorr, the corresponding trim value PWcorr is calculated (and stored) as the difference between of pulse width between:

- the injector specific pulse width for the reference HO (MAP-HOref) corresponding to Qi, determined from learned MAP-HO.m;
- the reference pulse width for the same HO, derived from the combination of tables MAP-PWref and MAP-HOref, or read for Qi from MAP-PWref.

Accordingly, MAP-PWcorr represents a table relating demand fuel to pulse width trim values PWcorr that are readily usable in the injection control strategy operating on the basis of Eq. 2 (drive mode).

The hydraulic open time may be determined based on any appropriate method. It may conveniently be determined based on measured/estimated values of CR and OD on the basis of Eq. 1.

Hence, during the learning phase, the CR and OD are measured for the various learning injector events, and the corresponding HO is calculated on the basis of Eq. 1.

The CR and OD may be determined by means of any appropriate method, as explained herein below. They should however not be considered as limiting; any appropriate method of determining the CR and/or OD may be used, currently known or to be developed.

As will be understood by those skilled in the art, the present method, may use approximation and interpolation methods as appropriate. In that sense, the determination or looking up of values from tables/maps may including a direct reading or interpolation of values from the maps. That is, expressions such as ‘determined’, ‘based’, ‘read’ or ‘looking-up’ in relation to a map, may involve direct reading of values and/or interpolation.

These and other aspects of the invention are also recited in the appended dependent claims.

According to another aspect, the invention also concerns a computer program comprising instructions which, when the program is executed by a computer, cause the computer to carry out the method according to the present disclosure.

According to still another aspect, the invention further concerns a control system configured for operating a fuel injection system of an internal combustion engine comprising at least one fuel injector associated with a combustion chamber and coupled to a fuel rail comprising a pressure sensor, the control system comprising function module(s) which, when executed by the control system, perform the steps of the method according to the present disclosure.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Embodiments of the invention are described below. The invention relates to fuel injection systems/circuits as commonly used in an internal combustion engine—not shown. As is known, it typically comprises a fuel rail or accumulator fluidly connecting the fuel therein to a series of injectors (e.g. of solenoid actuated fuel injectors). The circuit typically includes a fuel tank, an in tank electrical fuel pump, a fuel filter, and a high-pressure pump. A high-pressure sensor is located on the common rail in order to measure the fuel pressure inside the common rail. A high-pressure valve is provided on the common rail, which is a safety valve that opens when the pressure exceeds a preset value (typically passive in gasoline engines but can be controlled, e.g. in diesel systems). The fuel injection timing is controlled by the Engine control unit ECU which determines the logic control signal PW required to generate injector events for injecting fuel. The present injection is applicable to fuel injection systems using any kind of fuel, e.g. gasoline or diesel, GDi, CNG or H2.

Figure 1:
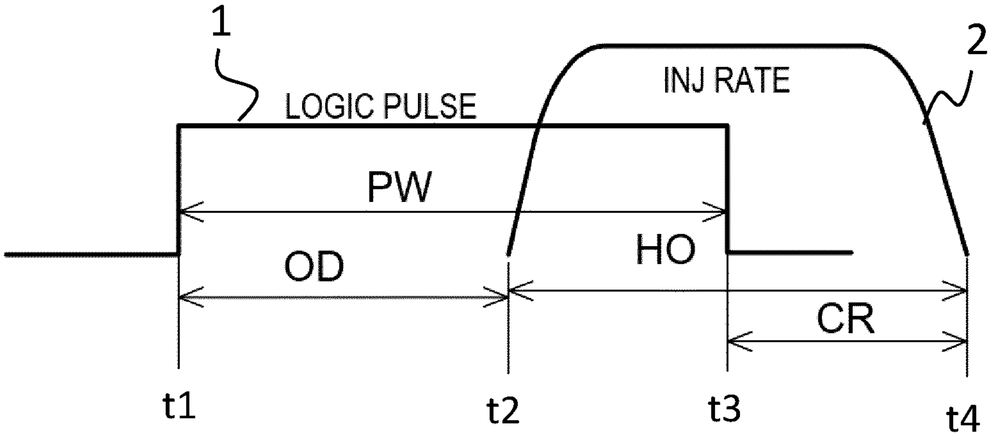
FIG. 1: shows simplified plots against time of an activation (logic) pulse applied to the solenoid of a solenoid activated fuel injector and the resulting needle displacement.

FIG. 1 illustrates the delayed response of the injector following the electrical command related to an injector event. The simplified plots against time show an activation (logic) pulse 1 sent to the solenoid of a solenoid activated fuel injector which includes a needle valve as known in the art, and plot 2 shows the fuel injection rate i.e. from the needle valve.

The pulse width (PW) of the activation pulse is shown; this is the logic pulse generated by the ECU, during which drive current is applied to the injector. The pulse width has a length/duration ΔT that corresponds to the time period between the start of the pulse at t1 and its ending at t3. The timing of the actuation pulse is typically determined by the Engine Control Unit, which adjusts the pulse length as a result of the demand quantity of fuel to be injected. The demand quantity of fuel is typically stored in a map which relates this to engine speed and torque demand.

Plot 2 shows the actuator needle lift, which defines the actual volume of fuel dispensed over time, i.e. the injection rate. As is known, there is a delay between the start of the electric pulse 1 and the opening of the actuator valve to dispense fuel, currently referred to as 'opening delay'. Whereas the electrical pulse starts at t1, the injector only opens at t2, i.e. the moment when the injector needle lifts-off from its seat and hence fuel start flowing into the combustion chamber. This time t2 is referred to as hydraulic timing of the injector and thus represents the actual time of the injection event at which fuel started to flow through injector. The needle closes at t4, coming back on its seat. Hence, fuel is injected between times t2 and t4. HO refers to the time therebetween, which is referred to as the hydraulic open time, where fuel is injected into a combustion chamber/space.

The closing response (CR) (often referred to alternatively as closing delay (CD) is the time between points t3 and t4. t4 is the needle closing time (NCT). The opening delay (OD) is that between t1 and t2, from the start of the activation pulse to the start of the needle valve opening.

Conventionally the duration of the drive pulse (PW) applied to the injector is read from a reference table defining a relationship between demand fuel quantity Qd (fuel mass) and PW (time). Such mapping noted MAP-PWref(Qd, PWref) is illustrated in FIG. 2, and typically includes various data sets of Qd vs. PWref in function of fuel rail pressure.

Figure 2:
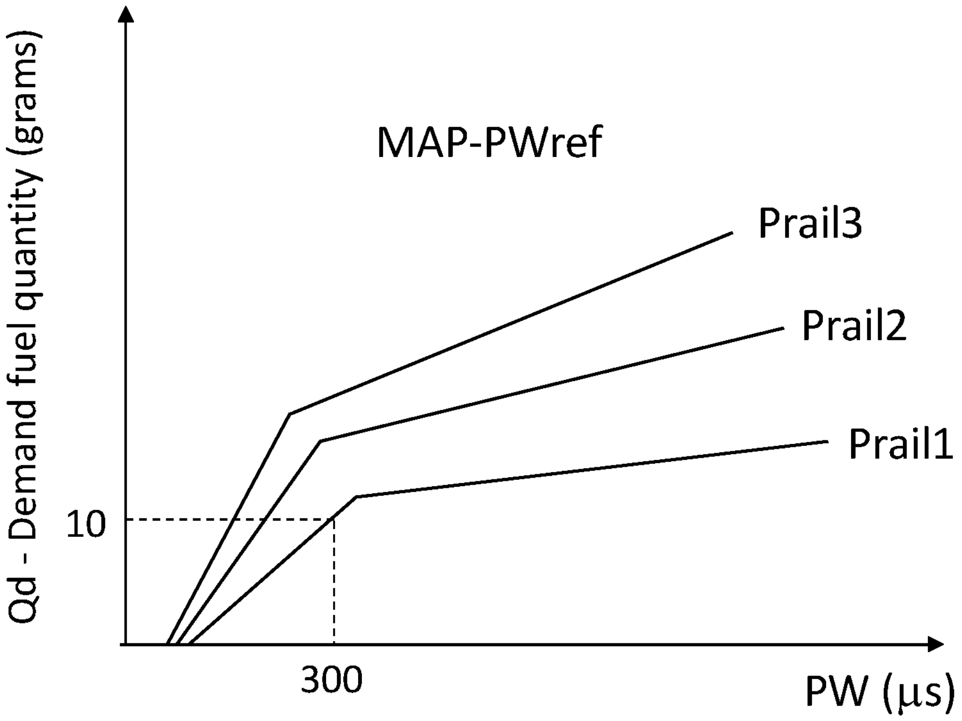
FIG. 2: is a plot illustrating the reference relationship of fuel demand Qd vs pulse width PW based on map MAP-PWref.

The curves of FIG. 2 may be referred to as master flow curves, and are representative of a fuel injector population, typically injectors produced in accordance with a same manufacturing technology (same construction). The master flow curve is preferably statistically representative of the injector population and has been obtained by detailed and systematic flow tests of injectors over the full range of pulse widths. Three master flow curves are shown for three different pressures (P1<P2<P3).

In practice, MAP-PWref may comprise data sets (Qd, PW, Prail) or equations (e.g. polynomials) describing the shape of the curve corresponding to the data sets, or a combination thereof, possibly over different segments.

In conventional operation strategies, in order to take into account the specifics of each injector (part to part variability and wear), the looked-up reference PWref value is modified by a corrective value (or trim), which may be noted PWcorr. Injection strategies using this compensation are herein referred to as 'drive mode'. Accordingly, the final value applied to the injector, PWf, is computed as:

$$PWf = PWref + Pwcorr \quad \text{[eq. 2]}$$

The Inventive Method

The present method proposes an approach of determining the corrective value PWcorr based on the actual injector opening duration, i.e. the hydraulic opening HO.

Therefore, an injector specific correction map MAP-PWcorr is used, which establishes a relationship between the desired fuel quantity Qd (mass) and the correction value PWcorr (time duration). MAP-PWcorr is learned by way of a dedicated procedure during engine runtime. MAP-PWcorr is learned once, as soon as possible when the engine is put into service. The learning procedure may be operated periodically to update the map with values better reflecting the injector wear.

Figure 3:
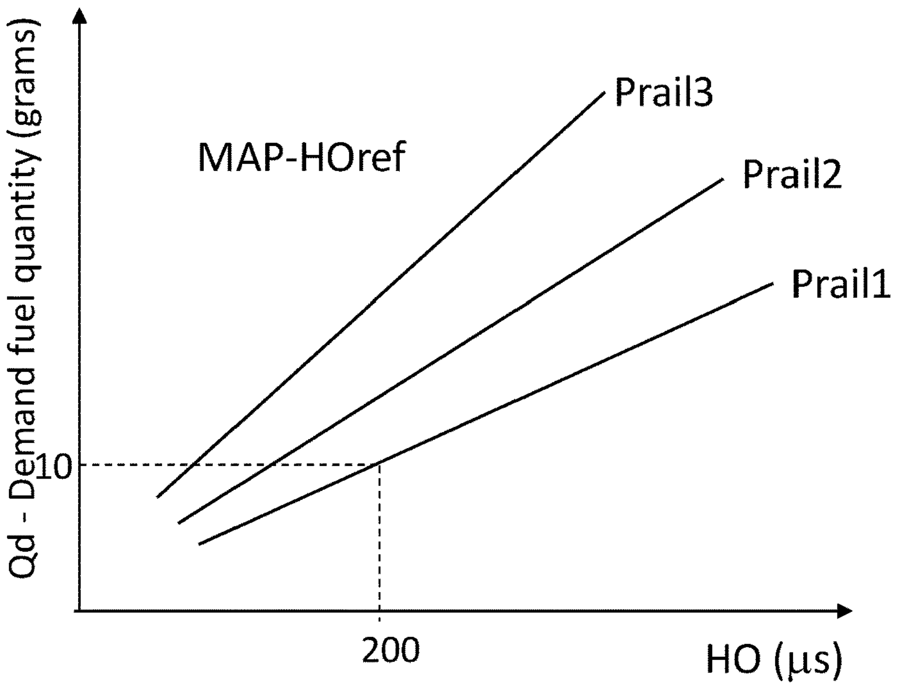
FIG. 3: is a plot illustrating the reference relationship between fuel demand Qd and hydraulic open time HO based on map MAP-HOref.

The learning of MAP-PWcorr needs a reference map establishing a relationship between fuel demand Qd and the hydraulic opening time HO, noted MAP-HOref. MAP-HOref is shown in FIG. 3 and constitutes a reference map that is statistically representative for a given injector family/design. Similar to MAP-PWref, MAP-HOref may be built by calibration/testing in the workshop.

In a first phase of the learning procedure, a plurality of injector events corresponding to a plurality of different fuel quantities over a range is performed. These learning injections are performed without compensation. The CR and OD are determined for each injector event and the injector specific HO is computed for the given fuel injection value.

Figures 5, 6:
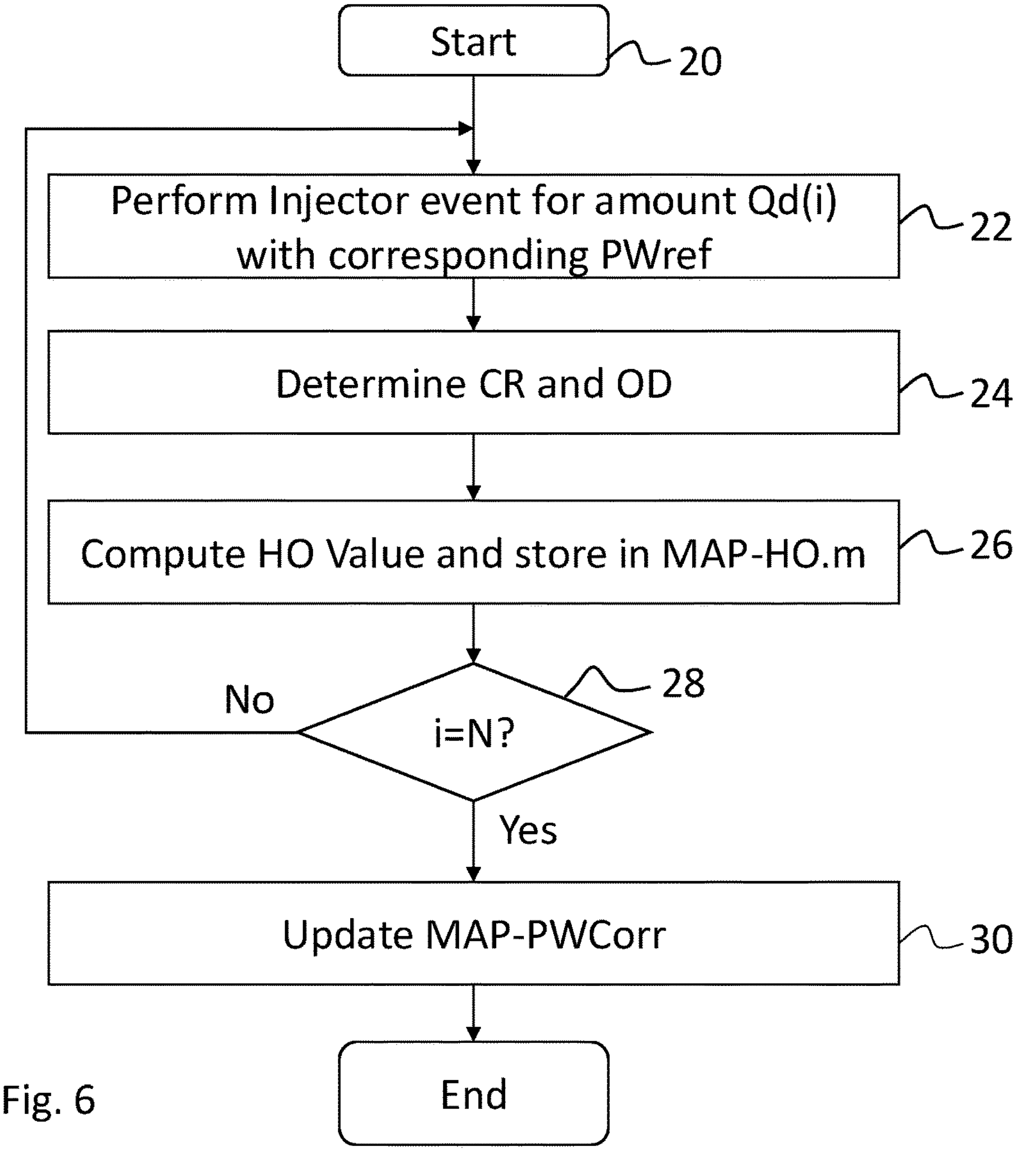
FIG. 5: is a table representing map MP-PWcorr defining a relationship between fuel demand Qd and the trim value PWcorr.
FIG. 6: is a flow diagram of an embodiment of the trim learning routine.

This is illustrated at FIG. 6, which represents a trim learning algorithm according to an embodiment of the invention.

In order to learn the injector-specific flow curve, a number of injector events are performed that correspond to N predetermined values of fuel demand Qd over a given range. These fuel values correspond to those in table MAP-PWcorr and noted $Q_1$ to $Q_N$.

At 22 a first injector event is performed for i=1, for value $Q_1$. For this purpose, a reference value PWref($Q_1$) is read from MAP-PWref. The injection event is performed for PWref, and the corresponding CR and OD are determined, as indicated at 24. OD can also be extracted from another specific measurement and can be used at this step. The measured hydraulic time HO.m($Q_1$) corresponding to this injector event may then be computed based on equation 1, step 26. The value is stored with the corresponding actuating value PWref in a learning table MAP-HO.m.

This injector learning phase is repeated for the N values of fuel demand. This is indicated by test box 28, whereby steps 22 to 26 is repeated until injections for the N values of fuel demand have been obtained.

Of course, the learning steps 22 to 26 can be repeated for several fuel pressures, and for each injector in the engine. The learning procedure may also be designed such that several points are measured for each value Qi, whereby the measured HO value stored in MAP-HO.m corresponds to an average value.

Since injector variability is more critical for smaller fuel quantities, it is desirable to have more data at smaller fuel quantities.

In summary, when the HO values corresponding to desired number of Qd values are measured, the response to test box 28 is Yes, and an injector specific table MAP-HO.m is thus obtained based on the learned/measured HO values, and stores the relationship between the pulse width and measured HO.m corresponding the learning injector events.

Figure 4:
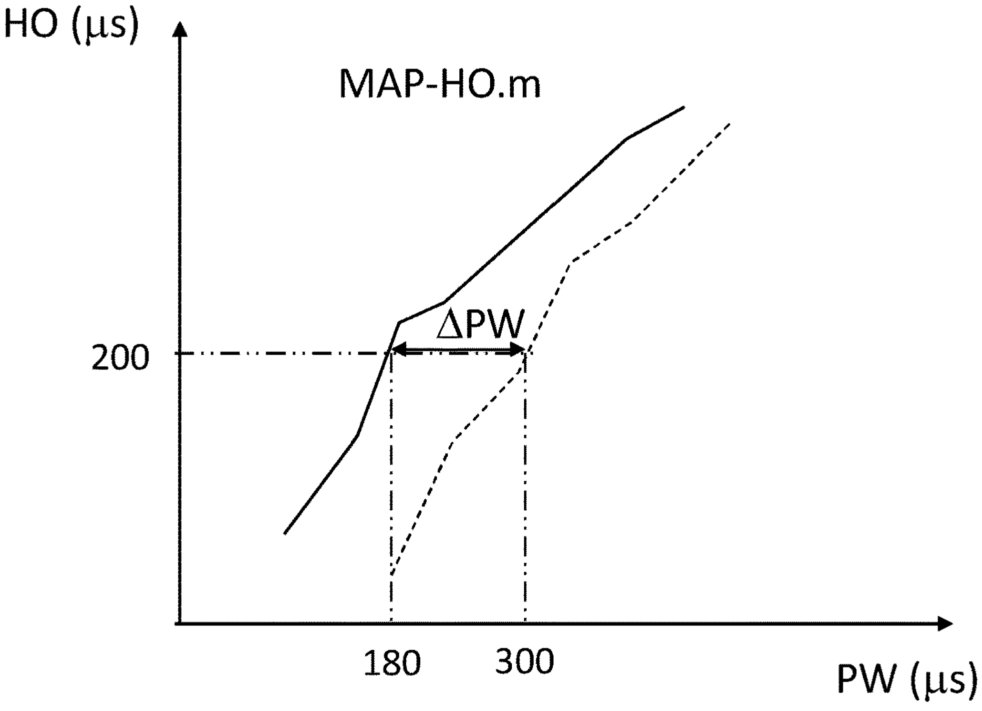
FIG. 4: is a plot of injector specific, measured hydraulic open time HO vs. pulse width.

MAP-HO.m is illustrated in FIG. 4 and shows only one curve in solid line, corresponding to one injector and one rail pressure. The dashed line represents the HO-PW curve as calculated from the reference maps MAP-PWref and MAP-HOref. This dashed line is represented in FIG. 4 only for the purpose of explanation and will not be stored as such in practice. Indeed, it allows visualizing the offset that may exist between the reference maps and the injector specific flow behavior. Due to injector variability, the values of PWref used to command the injector result in different values of hydraulic opening time HO. The knowledge of injector specific HO allows computing a pulse width difference, noted ΔPW, for a given HO.

Let us suppose that the ECU requests delivery of a fuel quantity of Qd=10 mg. The corresponding PW is looked up from MAP-PWref: PWref=300 μs.

It may also be noted from MAP-HOref that the reference value of HO corresponding to a fuel quantity of 10 g is 200 μs. That is, the reference hydraulic open time of an injector to inject 10 mg is 200 μs.

As can be seen from FIG. 4, a HO of 200 μs is actually obtained with this injector at a lower PW of 180 μs, whereas the reference maps give a PW of 300 μs.

From there, it can be concluded that in order to inject 10 mg with that injector, the reference command pulse PWref should be compensated by a value corresponding to the difference between the two points, noted ΔPW (here 180-300=−120). Thus, the proper length of the control signal should be 300-120=180 μs. In Eq. 2, ΔPW is expressed by PWcorr.

The second phase of the learning procedure comprises populating/updating the table MAP-PWcorr based on the learned data, namely MAP-HO.m, as indicated at 30 (in FIG. 6).

The PW value corresponding to the difference (delta) between measured and reference values of HO is determined from MAP-HO.m for each of the predetermined N values Qd. As already indicated, table MAP-PWcorr comprises a predetermined number of fuel values $Q_1$ to $Q_N$ (increasing values over given range). The corresponding value of PWcorr for each Qi is computed as a difference between two points:

- the pulse width for the reference hydraulic open time (MAP-HOref) corresponding to current fuel quantity Qi, as determined from MAP-HO.m; and
- the reference pulse width for the same reference hydraulic open time as determined from MAP-HOref combined with MAP-PWref, or read for Qi from MAP-PWref.

As a result, map MAP-PWcorr contains trim values that can be readily (by looking up MAP-PWcorr for a desired Qd) used in the injection control process, based on Eq. 2. For non-tabulated values of Qd, the corresponding trim value PWcorr may be determined by interpolation.

The determination of HO values from the learning injections involves the determination of CR and OD. As discussed above, the closing delay CD (or closing response time CR) of a solenoid operated fuel injector (such as a direct acting gasoline injector or hydraulic fuel injector) is defined as the time between the end of the activation pulse sent to the solenoid of the solenoid actuator, and the needle closing time (i.e. when the needle of the valve reaches the valve seat to prevent fuel flowing). This parameter may be determined by determining the needle closing time, NCT.

A known method of determining the NCT is based on analyzing the voltage/current across the injector solenoid. When pintle/needle of the injector hits the needle valve seat on closing, the actuator solenoid coil voltage slope changes, and can be observed in a time plot as a "glitch". The glitch time hence occurs at the needle closing time and the time between this glitch and the end of the pulse is the closing response (CR) or closing delay. The glitch is a point of inflection and may be determined by derivative methods (dV/dt first or second derivative) or trigonometry methods.

The opening delay may also be determined from the injector current trace, as known from EP 2 884 084. U.S. Pat. No. 5,747,684 discloses a method of determining opening delay by means of an accelerometer coupled to the injector. WO 19/076691 also describes method for determining injector opening and closing timings.

The invention claimed is:

1. A method of controlling fuel injection in an internal combustion engine having at least one cylinder with an associated fuel injector for performing injector events, wherein for each injector event a drive signal is generated to cause an opening of the fuel injector to spray fuel in accordance with a demand fuel quantity;

- wherein, in a drive mode, said drive signal has a length $PW_f$ determined from a reference length PWref and a correction value PWcorr;
- wherein PWref is determined from a reference map MAP-PWref of a relationship between demand fuel quantity and pulse length,
- wherein PWcorr is determined based on a map MAP-PWcorr depending on demand fuel quantity,
- wherein MAP-PWcorr is learned during engine runtime by comparing learned injector-specific hydraulic open times and reference hydraulic open times.

2. The method according to claim 1, wherein a learning phase is operated to perform a number of learning injector events over a predetermined demand fuel range, each injector event being performed with a corresponding non-corrected pulse width equal to the reference length PWref; and

- a map MAP-HO.m establishing a relationship between hydraulic open time and pulse width for said number of learning injector events is updated.

3. The method according to claim 2, wherein an opening delay OD and a closing response CR are determined for said number of learning injector events; and a measured hydraulic open time HO.m is determined as HO.m=PW+CR−OD.

4. The method according to claim 1, wherein map MAP-PWcorr is calculated based on MAP-HO.m, MAP-PWref and a reference map MAP-HOref of fuel demand vs. hydraulic open time,

- wherein MAP-PWcorr comprises a predetermined number of fuel quantities over a given range, and the PWcorr corresponding to a current fuel quantity of MAP-PWcorr is calculated as a difference of pulse width between:
  - the pulse width for the reference hydraulic open time (MAP-HOref) corresponding to current fuel quantity, as determined from MAP-HO.m; and
  - the reference pulse width for the same reference hydraulic open time as determined from MAP-HOref combined with MAP-PWref, or read for the current fuel quantity from MAP-PWref.

5. The method according to claim 1, wherein in said drive mode, the length of the pulse width PWf applied to the injector is calculated as $$PWf = PWref + PWcorr,$$

where PWref is determined from MAP-PWref and PWcorr from MAP-PWcorr for the requested demand fuel.

6. A computer program comprising instructions which, when the program is executed by a computer, cause the computer to carry out the method of claim 1.

7. A control system configured for operating a fuel injection system of an internal combustion engine comprising at least one fuel injector associated with a combustion chamber and coupled to a fuel rail comprising a pressure sensor, said control system comprising function module(s) which, when executed by the control system, perform the steps of the method according to claim 1.

* * * * *